US006643277B2

(12) United States Patent
Garrison et al.

(10) Patent No.: US 6,643,277 B2
(45) Date of Patent: Nov. 4, 2003

(54) FREQUENCY RE-USE FOR POINT TO MULTIPOINT APPLICATIONS

(75) Inventors: G. Jack Garrison, New Westminister (CA); Robert B. Foster, Jr., Bellevue, WA (US)

(73) Assignee: Harris Broadband Wireless Access, Inc., Bellevue, WA (US)

( * ) Notice: Subject to any disclaimer, the term of this patent is extended or adjusted under 35 U.S.C. 154(b) by 229 days.

(21) Appl. No.: 09/893,432

(22) Filed: Jun. 29, 2001

(65) Prior Publication Data

US 2002/0159405 A1 Oct. 31, 2002

Related U.S. Application Data

(63) Continuation-in-part of application No. 09/607,456, filed on Jun. 29, 2000.

(51) Int. Cl.[7] .................................................. H04Q 7/20
(52) U.S. Cl. ...................................... 370/329; 455/447
(58) Field of Search .............................. 455/447, 446, 455/509; 370/328, 329, 344

(56) References Cited

U.S. PATENT DOCUMENTS

| | | |
|---|---|---|
| 4,747,160 A | 5/1988 | Bossard |
| 5,420,851 A | 5/1995 | Seshadri et al. |
| 5,768,254 A | 6/1998 | Papadopoulos et al. |
| 5,809,431 A | 9/1998 | Bustamante et al. |
| 5,828,695 A | 10/1998 | Webb |
| 5,890,055 A | 3/1999 | Chu et al. |
| 6,006,069 A | 12/1999 | Langston |
| 6,016,311 A | 1/2000 | Gilbert et al. |
| 6,016,313 A | 1/2000 | Foster, Jr. et al. |
| 6,374,104 B1 * | 4/2002 | Croq et al. ................. 455/427 |
| 6,445,926 B1 * | 9/2002 | Boch et al. ................. 455/447 |
| 6,542,746 B1 * | 4/2003 | Dean .......................... 455/447 |

OTHER PUBLICATIONS

*Bell Systems Technical Journal* vol. 58 No. 1, "Advanced Mobile Phone Service", MacDonald, Jan. 1979, pp. 19–37 App 39–41.
*Microwave Mobile Communications* IEEE Press, "Coverage Layout of Small Cell Systems", Jakes, 1993, pp. 562–568.
*Introduction to Geometry* Wiley, $2^{nd}$ edition, General geometry theory on the grouping of cells, Coxeter, 1969, Various.

* cited by examiner

Primary Examiner—Kenneth Vanderpuye
(74) Attorney, Agent, or Firm—Duane Morris LLP

(57) ABSTRACT

The inventive cellular reuse plan uses a tessellating grouping of cells to form a pattern, which is then repeated to form a larger cell cluster. The mosaic pattern uses several different cell types. Each cell type preferably comprises a different set of channel assignments. The channels are preferably provided additional orthogonality, such as through the use of polarization, where channel assignments within a cell are grouped to provide adjacent sectors, as a block, with primary communication links using commonly polarized channels. The different cell types are then arranged in the mosaic pattern. Each particular cell in the pattern has adjoining cells that are of a different type than the particular cell. The most preferred embodiment cell pattern does not utilize all available channels to thereby provide reserve channels for use in providing redundant links and/or added capacity. Preferably, each of the reserve channels provides redundant communication links to a block of commonly polarized primary channels.

56 Claims, 5 Drawing Sheets

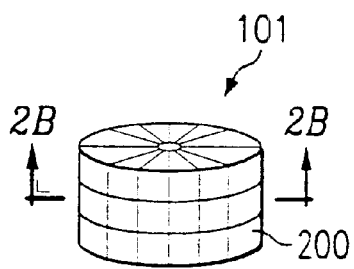
FIG. 2A
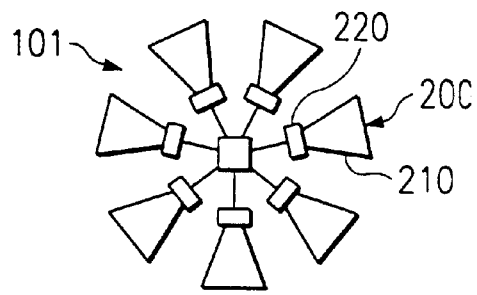
FIG. 2B
| A | B | C | D | E | F |
|---|---|---|---|---|---|
| P | Q | R | S | T | U |
|---|---|---|---|---|---|
FIG. 3A
CELL TYPE 1
| $A_V$ | $R_V$ | $E_V$ | $B_H$ | $S_H$ | $F_H$ |
|---|---|---|---|---|---|
CELL TYPE 2
| $B_V$ | $S_V$ | $F_V$ | $C_H$ | $T_H$ | $Q_H$ |
|---|---|---|---|---|---|
CELL TYPE 3
| $C_V$ | $T_V$ | $Q_V$ | $D_H$ | $U_H$ | $P_H$ |
|---|---|---|---|---|---|
CELL TYPE 4
| $D_V$ | $U_V$ | $P_V$ | $E_H$ | $A_H$ | $R_H$ |
|---|---|---|---|---|---|
FIG. 3B
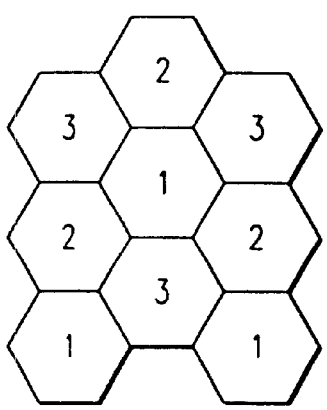
FIG. 3C

FREQUENCY RE-USE FOR POINT TO MULTIPOINT APPLICATIONS

RELATED APPLICATIONS

The present application is a continuation-in-part of U.S. patent application Ser. No. 09/607,456, entitled "FREQUENCY RE-USE FOR TDD APPLICATIONS," filed Jun. 29, 2000, the disclosure of which is hereby incorporated herein by reference. The present application is related to and is being concurrently filed with commonly assigned U.S. Patent Applications entitled "SYSTEM AND METHOD FOR PROVIDING A COMMUNICATION SYSTEM CONFIGURABLE FOR INCREASED CAPACITY" and "SYSTEM AND METHOD FOR PROVIDING REDUNDANCY IN A SECTORED WIRELESS COMMUNICATION SYSTEM," the disclosures of which are hereby incorporated herein by reference. The present application is also related to commonly assigned U.S. Pat. No. 6,016,313, entitled "SYSTEM AND METHOD FOR BROADBAND MILLIMETER WAVE DATA COMMUNICATION," issued Jan. 18, 2000, and copending and commonly assigned U.S. patent application Ser. No. 09/434,832, entitled "SYSTEM AND METHOD FOR BROADBAND MILLIMETER entitled "MULTI-LEVEL INFORMATION MAPPING SYSTEM AND METHOD," filed Jun. 7, 1999, the disclosures of which are hereby incorporated herein by reference.

TECHNICAL FIELD

This invention relates in general to high data rate (broadband) radio frequency communications, and more particularly to frequency re-use cellular plans that minimize the interference sensitivity of such communication.

BACKGROUND

In the past, high speed information communication between processor-based systems, such as local area networks (LAN) and other general purpose computers, separated by significant physical distances has been an obstacle to integration of such systems. The choices available to bridge the physical gap between such systems have not only been limited, but have required undesirable tradeoffs in cost, performance, reliability, and service deployment time.

One group of historically available communication choices includes such solutions as the utilization of a standard public switch telephone network (PSTN) or multiplexing signals over an existing physical link to bridge the gap and provide information communication between the systems. Although such solutions are typically inexpensive to implement, they include numerous undesirable traits. Specifically, since these existing links are typically not designed for high speed data communication, they lack the bandwidth through which to communicate large amounts of data rapidly. As in-building LAN speeds increase to 100 Mbps, the local PSTN voice grade circuits even more markedly represent a choke point for broadband metropolitan area access and therefore are becoming a less and less desirable alternative. Furthermore, such connections lack the fault tolerance or reliability found in systems designed for reliable transmission of important processor-based system information.

Another historically available group of communication choices is found at the opposite end of the price spectrum than those mentioned above. This group includes such solutions as the utilization of a fiber optic ring or point-to-point microwave communication. These solutions are typically cost prohibitive for all but the larger users. The point-to-point systems require a dedicated system at each end of the communication link which lacks the ability to spread the cost of such systems over a plurality of users. Even if these systems were modifiable to be point-to-multipoint, to realize the economy of multiple system use of some system elements, the present point-to-point microwave systems would not provide broadband data services but rather traditional bearer services such as T1 and DS3. Furthermore these systems typically provide a proprietary interface and therefore do not lend themselves to simple interfacing with a variety of general purpose processor-based systems.

Although a fiber optic ring provides economy if utilized by a plurality of systems, it must be physically coupled to such systems. As the cost of purchasing, placing, and maintaining such a ring is great, even the economy of multi-system utilization generally does not overcome the prohibitive cost of implementation.

Accordingly, point-to-multipoint systems such as shown and described in above referenced U.S. Pat. No. 6,016,313 have been developed to provide broadband communication infrastructure in an efficient and economical alternative. For example, a preferred embodiment point-to-multipoint system described in the U.S. Pat. No. 6,016,313 provides for a network of point to multipoint hubs to establish cellular type coverage of a metropolitan area. Such systems are generally more economical to deploy than systems such as fiber optic networks, due to their use of wireless links avoiding the cost of laying fiber to all nodes on the network, and point-to-point microwave, due to the sharing of resources among several or many users.

The problem addressed by the invention is the limited spectrum available for use in the aforementioned point-to-multipoint, or similar, systems. The invention provides for dense re-use of frequencies in the spectrum while still providing desirable signal quality, e.g. high signal/noise ratio and/or low interference. Moreover, the preferred embodiment of the invention provides for efficient use of the spectrum such that portions of the spectrum remain available for use in special applications, such as providing unique channels for implementing link redundancy and/or providing unique channels for use in point interference situations.

These and other objects, features and technical advantages are achieved by a system and method which provides a cellular reuse plan. The invention allows for a tessellating (repeating in the form of a mosaic pattern) grouping of cells that have controlled carrier to interference limits that meet acceptable carrier to interference (C/I) levels. The invention preferably uses geometry theory in the grouping of the cells, (see Introduction to Geometry, by H. S. M. Coxeter, Wiley, $2^{nd}$ edition 1969, which is incorporated herein by reference).

The invention preferably uses a uniformly rotated set of identical or substantially identical cell assignments within a mosaic repeat pattern. The rotated repeating cell is used because of practical limits on the number of available frequency, or other channel, assignments. The number of assignments is preferably associated with the allocated bandwidth and required data throughput of subscribers.

The preferred embodiment of the invention operates in line of sight (LOS) system, and preferably uses polarization discrimination between ones of the adjacent cell sectors to thereby provide additional orthogonal spectrum (note that polarization works for non-line of sight also). The mosaic pattern of the preferred embodiment uses several different cell types. Each cell type of the preferred embodiment comprises a different set of frequency, or other channel, assignments. The different cell types may be arranged or deployed in the mosaic pattern.

The cells of the present invention may comprise hexagonal or square shapes, the mathematics for which are discussed in Advanced Mobile Phone Service, Bell Systems Technical Journal, January 1979, and Microwave Mobile Communications, by W. C. Jakes, IEEE Press, reissued 1993, both of which are hereby incorporated herein by reference. Note that other cell shapes could be used according to the present invention, for example circular, triangular, octagonal, etcetera.

The preferred embodiment of the invention allows for the deployment of both FDD (frequency division duplex) and TDD (time division duplex) PTM (point to multipoint) cellular systems under conditions of controlled, and acceptable, levels of intra-system interference. For TDD systems, preferred embodiments of the present invention have no burst synchronization requirement between cells, as well as no transmit/receive symmetric transmission requirement between different sectors in a cell or different sectors within a multi-cell system, i.e., outbound/inbound sector transmission duration can be dynamically adapted in each sector to meet user requirements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2A illustrates an isometric view of the centralized communication array of a preferred embodiment of the present invention;

FIG. 2B illustrates a horizontal plane cross section view of the centralized communication array depicted in FIG. 2A;

FIG. 3A depicts a preferred embodiment channelization scheme with respect to a particular portion of spectrum;

FIG. 3B depicts assignment of the channels of FIG. 3A to create 4 unique cell types according to the present invention;

FIG. 3C depicts a preferred embodiment of the inventive mosaic pattern of cell re-use;

DETAILED DESCRIPTION

Figure 1:
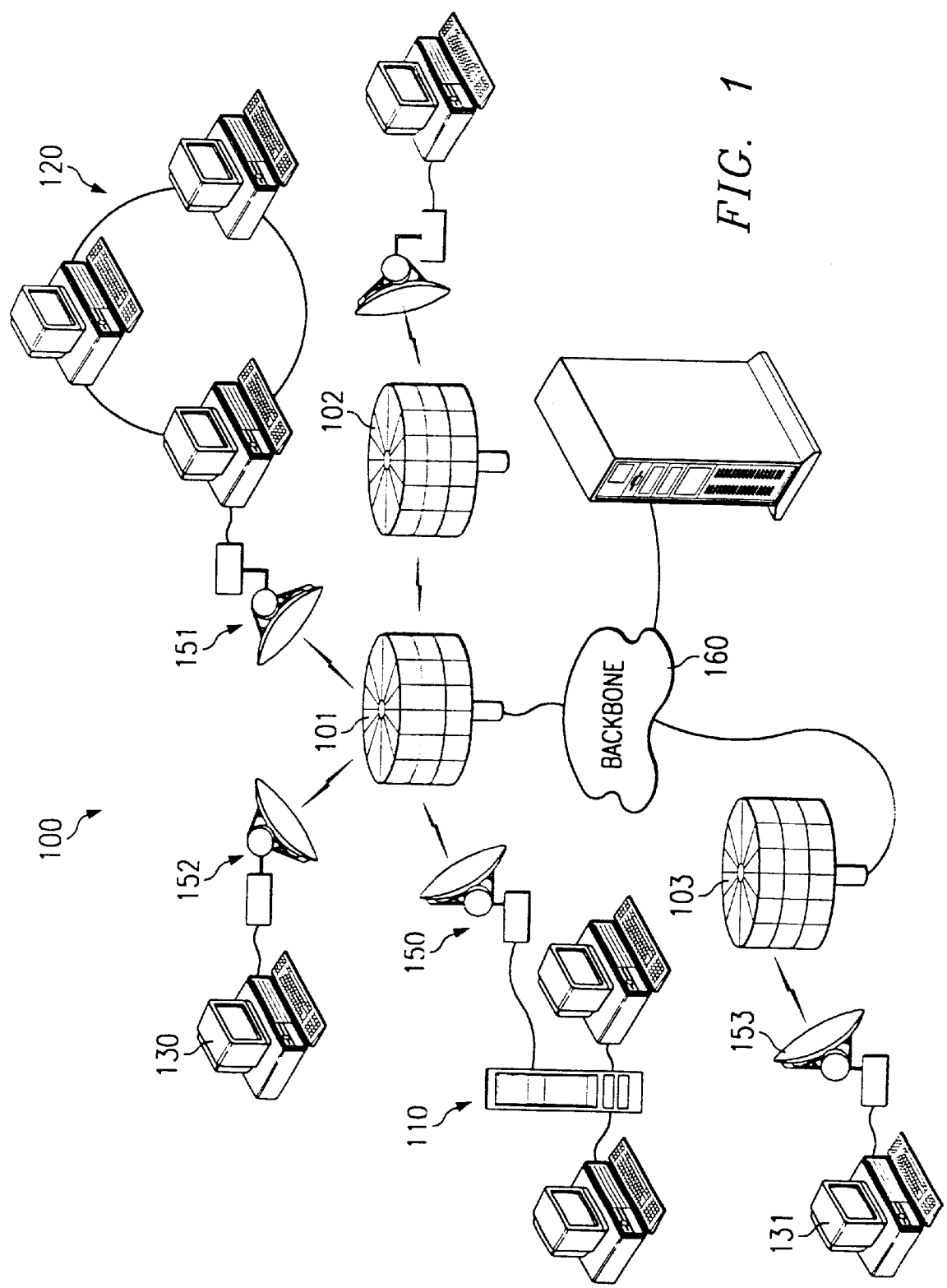
FIG. 1 illustrates the interconnection of processor-based systems of a preferred embodiment of the present invention.

The preferred embodiment of the present invention may be used in providing high speed data communication via a broadband air interface allowing data access between subscriber's remotely located systems although the concepts of the present invention may be utilized in any wireless communication system, for example, wireless LANs or telephonic systems. Referring to FIG. 1, it can be seen that such wireless communication may be utilized, for example, to provide high speed bridging of a physical gap between a plurality of processor-based systems, as illustrated by system 100. The processor-based systems may include local area networks (LAN), such as LANs 110 and 120, or individual computer systems, such as PC 130. It shall be appreciated that the processor-based systems utilizing the present invention may be general purpose computers, both standing alone and interconnected such as by a LAN. Furthermore, the system can connect other communication systems such as voice or video in combination with, or in place of, communication sourced by the above mentioned processor-based systems.

Systems bridged by the present invention may utilize a communication device, hereinafter referred to as a "node," for communicating with a centralized communication device also of the present invention, hereinafter referred to as a "hub." Still referring to FIG. 1, a hub is illustrated as element 101 and several nodes are illustrated as elements 150, 151, and 152 connected to LANs 110 and 120 as well as to PC 130.

Also, as illustrated in FIG. 1, such wireless communication may be utilized to provide high speed communication between a processor-based system, having a node coupled thereto, and communication backbone, such as backbone 160, through hub 101. It shall be understood that backbone 160 may be any form of communication means, such as a broadband fiber-optic gateway or other broadband data grade connection, T1 communications lines, a cable communication system, the Internet, or the like, physically connected to hub 101. Moreover, backbones, such as illustrated by backbone 160, may be utilized to interconnect a plurality of hubs into a communications network.

A communication network may also comprise a plurality of hubs, which is also illustrated in FIG. 1. Through such a network, a node, such as node 150, in direct communication with one hub, such as hub 101, may communicate with a node, such as node 153, in direct communication with another hub, such as hub 103. Such communication may be accomplished through the two hubs interconnection via a backbone, such as backbone 160. Of course, it shall be understood that intercommunication between hubs may be accomplished through information "back-hauling" via air gap communication between two hubs such as is illustrated with hubs 101 and 102. It shall be appreciated that a communications network may include any number of hubs in communication with other hubs, through such means as air gap or direct backbone interconnection, or the like. Information communicated from a node in direct communication with one hub may be routed through various such interconnections to a node in direct communication with any hub of the communication network.

In a preferred embodiment, the hub of the present invention is comprised of a group of restricted beam width antennas (sector antennas, although alternative embodiments may utilize a single multi beam antenna or other antenna systems). As a group, the sector antennas allow for radiation of a desired service area, such as omni directional transmission coverage of the hub transmission area. This area, ideally hexagonal in nature to facilitate complete coverage of an area without, or with minimal, overlap, represents a cell. One such individual antenna is depicted as antenna module 200 in FIG. 2A, preferably having front end module 220 and antenna element 210 as shown in FIG. 2B. Of course antenna configurations other than that illustrated may be utilized according to the present invention. The antenna elements are preferably narrow beam directional antennas having a predetermined radiation pattern beam width although various configurations and/or combinations of antennas may be used according to the present invention. These antennas are preferably geometrically pointed to provide an omni directional composite radiation pattern. However it shall be understood that only the number of antenna elements required to communicate with a predetermined number of remote systems, rather than an omni directional configuration, may be used, if desired. Typically, antenna sector beam widths are be selected from 30, 45, 60 and 90 degrees. The combination of highly directional antennas, such as the aforementioned 30 and 45 degree antennas, with high gain provides for improved frequency reuse and reduces the likelihood of intra cell and inter cell interference.

In the preferred embodiment, where omni-directional coverage by hub 101 is to be utilized, individual antenna elements are arranged azimuthally, as illustrated in FIG. 2B, to cover a full 360 degree radius in a horizontal plane. It shall be appreciated that arranging antenna elements in this manner can provide blanket radio communication coverage radially about hub 101 by selecting the communication lobe of each antenna element to provide coverage in areas where the neighboring antenna elements are not so providing coverage.

Of course, as discussed above, the addition of antenna elements sufficient in number to provide a full 360 degree radiation pattern may be accomplished modularly as system use demands. It shall be appreciated that, even where ultimately 360 degree coverage is desired, the modular nature of the individual antenna elements provides an economic means by which to provide initially limited coverage to a developing area. For example, where only a few locations, or subscribers, within a geographic area covered by a particular hub site are desirous of communications by the present invention, a hub, including only those antenna elements necessary to service these subscribers, may be erected. Thereafter, as additional subscribers desire service within the service area of the hub, additional antenna elements may be added to the hub to provide service to their associated nodes. Ultimately the hub may be filled out with individual antenna elements to achieve communications in a full 360 degree radius about the hub.

For 30 degree sector assignment, it is preferable that a total of 12 individual antenna elements, each having a communication lobe with approximately a 30 degree azimuthal beam width, are utilized to accomplish 360 degree communication about hub 101. However, any number of individual elements could be utilized depending on individual design constraints, such as the presence of reflected waves and their associated multipath interference. Additionally, as discussed above, only the number of antenna elements needed for communication with certain identified nodes 150 may be used if desired.

It should be appreciated that the present invention is not limited to the use of any particular sector size and/or to the use of any one sector size. For example, the aforementioned 360 degree sector may be provided by a combination of two 90 degree, two 45 degree, and three 30 degree sectors. In fact a preferred embodiment of the present invention is initially deployed using four 90 degree sectors, one or more of which may be subsequently replaced with smaller sectors, such as two 45 degree sectors or three 30 degree sectors, as demand requires. Systems providing for growth to accommodate increased communication capacity through the use of various sector sizes are shown in the above referenced patent application entitled "System and Method for Providing a Communication System Configurable for Increased Capacity." Additionally or alternatively, the use of various sizes of sectors according to the present invention may be to provide for communication link redundancy as shown and described in the above referenced patent application entitled "System and Method for Providing Redundancy in a Sectored Wireless Communication System."

The present invention provides a cellular reuse plan wherein available spectrum is distributed and reused efficiently among cells of the plan. Additionally, the most preferred embodiment of the present invention provides at least a portion of the available spectrum as "reserve" spectrum, to allow its use in special applications, such as providing unique channels for implementing link redundancy and/or providing unique channels for use in point interference situations. For example, at the border between markets there may be another operator using the same, or a portion of the same, spectrum which may present an interference situation in the channel plan of the present invention. Similarly, there may be an anomalous source of interference experienced at a particular sector or sectors, not otherwise experienced throughout the system. Channels of the reserve spectrum may be substituted in the reuse plan to mitigate these point interferers.

According to a preferred embodiment, available spectrum is divided into multiple channels, such as may be assigned either singularly or in sets, to sectors of a preferred embodiment cell. It should be appreciated that multiple spectrum channelization techniques may be utilized according to the present invention. For example, TDMA techniques may be utilized to provide multiple substantially simultaneous access on a carrier to more than one node disposed in a particular sector.

A preferred embodiment channelization of available spectrum is shown in FIG. 3A. Here the available spectrum has been divided into 12 unique channels or channel sets. Specifically, the available spectrum of this preferred embodiment is divided into unique channels A–F and P–U, where channels A–F are substantially contiguous frequency blocks and channels P–U are substantially contiguous frequency blocks, which may or may not have portions of the available spectrum set aside as guard bands. The channels of the preferred embodiment of FIG. 3A may be provided through division of the 150 MHz Local Multipoint Distribution System (LMDS) B Block spectrum, such that each of channels A–F and P–U are approximately 12.5 MHz channels (minus any guard bands implemented). Of course, the present invention may be utilized with any particular portion of the spectrum and is not limited to the LMDS band described nor to the particular number and/or sizes of channels illustrated. Moreover, it should be appreciated that the present invention is not limited to the use of substantially equal channels as illustrated.

Using these 12 channels alone, the present invention provides 12 degrees of freedom with respect to frequency reuse. However, using orthogonal polarizations, the number of degrees of freedom may at least be doubled. For example, by using both horizontal and vertical polarization with respect to each of the 12 channels, i.e., $A_V$, $A_H$, $B_V$, $B_H$, etcetera, the illustrated embodiment provides 24 degrees of freedom. Additionally or alternatively, embodiments of the present invention may use additional or other polarization orthogonalities, such as slant left and slant right, to provide a desired number of degrees of freedom. As will be discussed in detail below, assignment of particular polarizations for use in sectors according to the present invention preferably uses polarization discrimination between ones of the adjacent cell sectors to thereby provide regions utilizing a particular polarization which may include multiple adjoining sectors.

The multiple cell types utilized in the cellular pattern of the present invention may be defined from the available channels. Since an antenna pointed in one direction will typically not receive energy from the opposite direction, the frequencies selected for use in a particular cell of the preferred embodiment can be repeated within that cell, by offsetting them at 180 degrees. (Note that a back lobe is almost always present. Thus, there must be sufficient discrimination or attenuation of energy from the opposite direction, e.g., by use of a shield between the antennas and/or spacing that separates the two back to back antennas.) In a cell of a preferred embodiment of the present invention having 30 degree sectors, twelve of which provide 360 degree cell coverage, will only need 6 different channel assignments. Using the polarization orthogonality of the preferred embodiment, these 6 different channel assignments may be provided using less than 6 unique channels, if desired.

According to the preferred embodiment of the present invention, adjoining sectors of a cell (flanking sectors) are assigned frequencies that are spaced apart from each other on the spectrum to further mitigate interference. Directing attention to FIG. 3B, a most preferred embodiment frequency/polarization assignment of the channels of FIG. 3A into cell types 1–4 (it being understood that 12 sectors are defined according to the preferred embodiment by repeating the channel assignments in a sector at 180 degrees). As illustrated in FIG. 3B, cell type 1 of this preferred embodiment uses channels, or channel sets, $A_V$, $R_V$, $E_V$, $B_H$, $S_H$, and $F_H$. Cell type 2 of this preferred embodiment uses channels, or channel sets, $B_V$, $S_V$, $F_V$, $C_H$, $T_H$, and $Q_H$. Cell type 3 of this preferred embodiment uses channels, or channel sets, $C_V$, $T_V$, $Q_V$, $D_H$, $U_H$, and $P_H$. Cell type 4 of this preferred embodiment uses channels, or channel sets, $D_V$, $U_V$, $P_V$, $E_H$, $A_H$, and $R_H$.

As stated earlier, the present invention is not limited to the particular portion of spectrum nor the division of spectrum shown in the preferred embodiment. For example, a smaller channel size may be utilized to yield more channels in the same size spectrum. Similarly, a larger portion of spectrum may be utilized to provide more channels. A larger channel number system might be developed according to the present invention such as, for example, an 18 channel system comprising channels: A, B, C, D, E, F, G, J, K, P, Q, R, S, T, U, W, X, and Y in ascending sequence. The larger number of channels would allow for more cell types and/or more sectors per cell type. Additional cell types could be used as reserve cells or for developing a different mosaic pattern.

It should be appreciated that channel $R_V$ of the preferred embodiment cell type 1, for example, is spaced in frequency from the channels of adjacent or flanking sectors, here $A_V$ and $E_V$, by having at least 3 of the channels between them. In fact, in the preferred embodiment cell type 1 illustrated, no channel which is utilized in a cell physically adjacent to another channel is spaced any closer than having 2 of the channels between them. This spacing creates isolation between the channels, and therefore these channels can be placed next to each other in the cell with little or no cross coupling or interference. Accordingly, preferred embodiments of the present invention utilize cell types having at least one channel of spectrum and/or at least selection of orthogonal polarization between channels utilized in a cell physically adjacent to one another. The most preferred embodiments of the present invention are configured to optimize this channel spacing of physically adjacent or flanking channels, preferably having at least two channels between physically adjacent channels.

According to the preferred embodiment of the present invention, the 6 channel cell configuration providing the above described channel spacing, using a total of 12 channels provides for the formation of two basic cell types, i.e., two different basic distributions of the channels to provide the minimum channel spacing, although the present invention is not limited to the particular channel distributions illustrated. Using polarization, adds additional degrees of freedom and allows for horizontal (H) and vertical (V) cell types, for the 4 different cell types shown using the two basic channel distributions.

As shown in FIG. 3C, a preferred embodiment of the present invention provides for arrangement of each cell or hub in a channel reuse mosaic pattern comprising 9 cells. The pattern is preferably comprised of three different cell types, preferably cell types 1, 2, and 3 as shown in FIG. 3B. This pattern provides that each particular cell is bordered only by cell types other than its own type. For example, cell 2 is adjoined with cells 1 and 3. This arrangement limits interference between the frequency assignments for each cell. Note that same cell types are spaced at a uniformly maximum separation distance from each other. The pattern of FIG. 3C could be replicated multiple times to produce a larger pattern. Also note that portions of the pattern can be used as needed. For example, a small cluster of two or three cells may be needed to satisfy the demands of a particular area. Also, when expanding or filling in a service area, portions of the pattern can be added to the existing cluster. For example, suppose the existing cluster comprises the pattern shown in FIG. 3C, then service can be expanded by adding a cell of cell type 2 to the space below the lower center cell of cell type 3 and in between the two lower cells of cell type 1. The partial pattern additions would be added to the existing cluster in accordance with the cell pattern.

Figure 5:
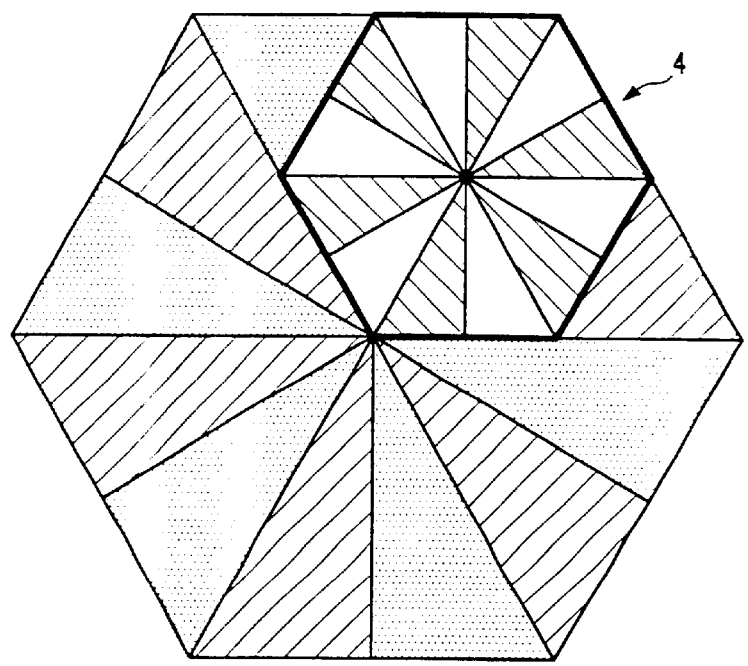
FIG. 5 depicts an overlay cell.

The channels of reserve cell type 4 can be used in a number of ways according to the present invention. As will be discussed in further detail below, channels of reserve cell type 4 may be utilized in providing link redundancy. Additionally or alternatively, channels of reserve cell type 4 may be used in providing an overlay cell. An overlay cell may be added to the pattern for high density areas, e.g. the business district of a large city. The overlay can be a microcell, which is a lower power cell than a standard cell, as shown in FIG. 5, or the overlay cell may have the same power as the other cells in the pattern.

Channels of the reserve cell type (sector assignments) can also provide interference free higher modulation index transmission into specific sectors. Reserve cells can provide resolution of co-channel interference conflicts across BTA (business trading area) boundaries by sector assignment substitution (thus, eliminating problems from point noise sources), and provide resolution of adjacent frequency/same frequency interference conflicts when multiple operators deploy on the same area, again by sector assignment substitution.

Figure 4A:
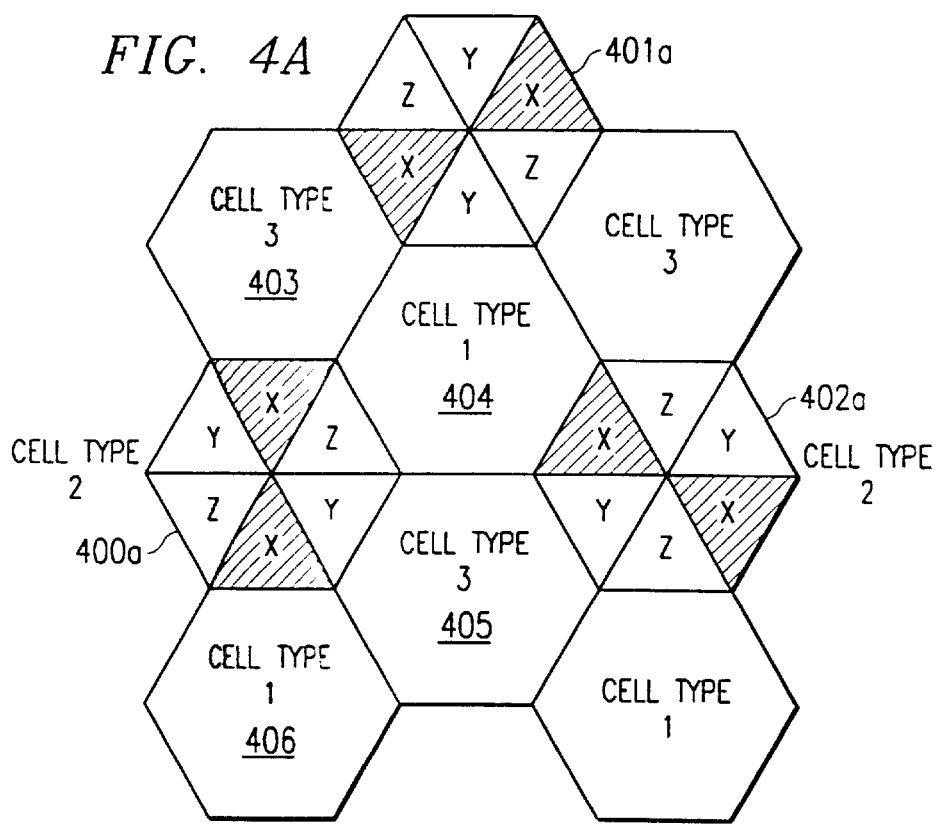
FIG. 4A depicts the inventive pattern of FIG. 3 populated with six sector cells of three different cell types, wherein each re-use of a cell type has sector rotation according to the present invention.

According to the preferred embodiment of the present invention, the individual cell types are rotated as they are repeated in the pattern. This is shown in FIG. 4A, wherein cell type 2 is shown to comprise three channel assignments, namely X, Y, and Z. Note that X could be a set of channels, thus set X is different from sets Y and Z. This arrangement has 60 degree sectors, with each cell having 6 sectors. When channel assignments are repeated at 180 degrees, each cell type has 3 different assignments. Each time cell type 2 is duplicated in the pattern, the channel/sector assignments are rotated by a predetermined amount, such as the illustrated 60 degrees. For example, cell 400*a* has channel X at the 0 degree position, while cell 401*a* has the X channel at the 60 degree position, and cell 402*a* has the X channel at the 120 degree position.

Note that the 60 degree rotation of this preferred embodiment is derived from the hexagonal cell structure and the channel reuse factor of 2 in order to provide rotation sufficient to place assignment of a channel upon a different cell face at each reuse within the pattern without rotating the assignment to the extent that the reuse of the channel in the cell will directly face use of this channel at another cell in the pattern. Accordingly, the reuse of channels as provided in the preferred embodiment does not experience substantial co-channel interference as the preferred embodiment sector rotation further isolates each reuse of channels. According to this preferred embodiment rotation technique, other cell structures and/or channel allocations may utilize different rotations, e.g. a square may utilize a 90 degree rotation. Of course, other rotations determined to provide a desired level of co-channel isolation may be utilized in any cell structure of the present invention, if desired.

Referring still to FIG. 4A, note that to cell 400*a*, cells 401*a* and 402*a* are adjacent cells, while cells 403, 404, 405, and 406 are adjoining cells. Note that additional adjacent cells and adjoining cells would be present for cell 400*a* if additional cells are added to the existing cluster that are around cell 400*a*. The rotations of the preferred embodiment minimize the direct facing of same frequency/same polarization sector assignment for the different cell patterns. In other words, the same channels in different cells are not transmitting/receiving in parallel directions. In addition to the distance separation, the off boresight antenna discrimination, i.e., avoidance of a particular frequency and polarization being directed at a sector having the same frequency and polarization, provides additional interference suppression.

Figure 4B:
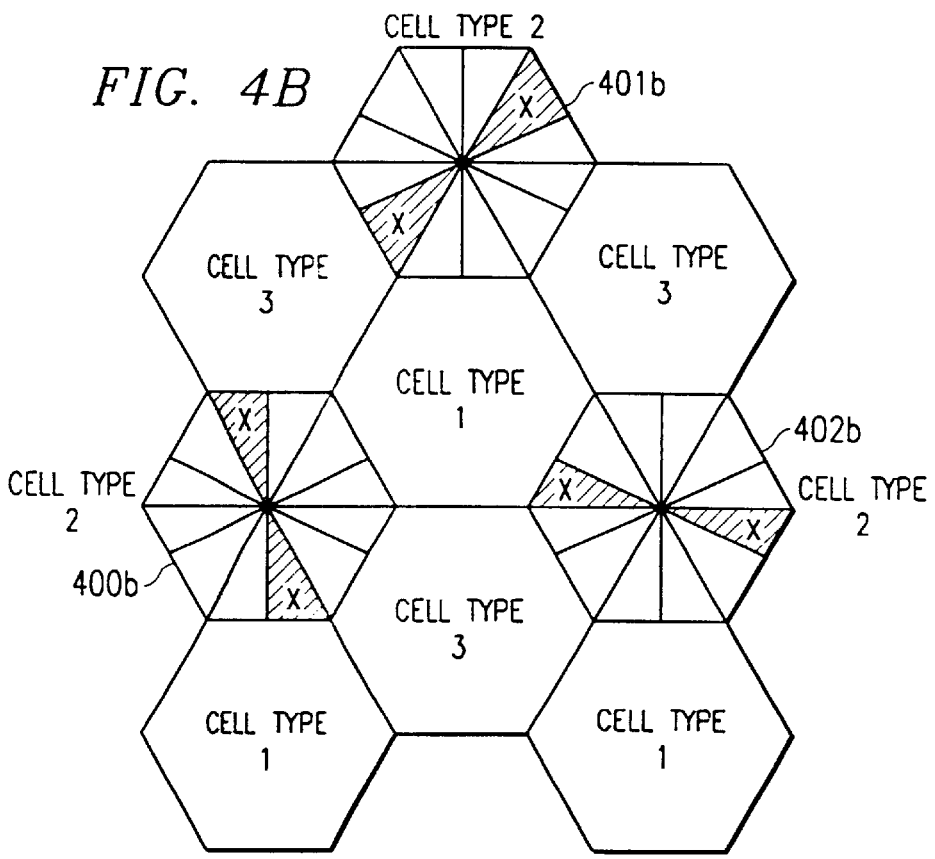
FIG. 4B depicts the inventive pattern of FIG. 3 populated with twelve sector cells of three different cell types, wherein each re-use of a cell type has sector rotation according to the present invention.
Figure 4C:
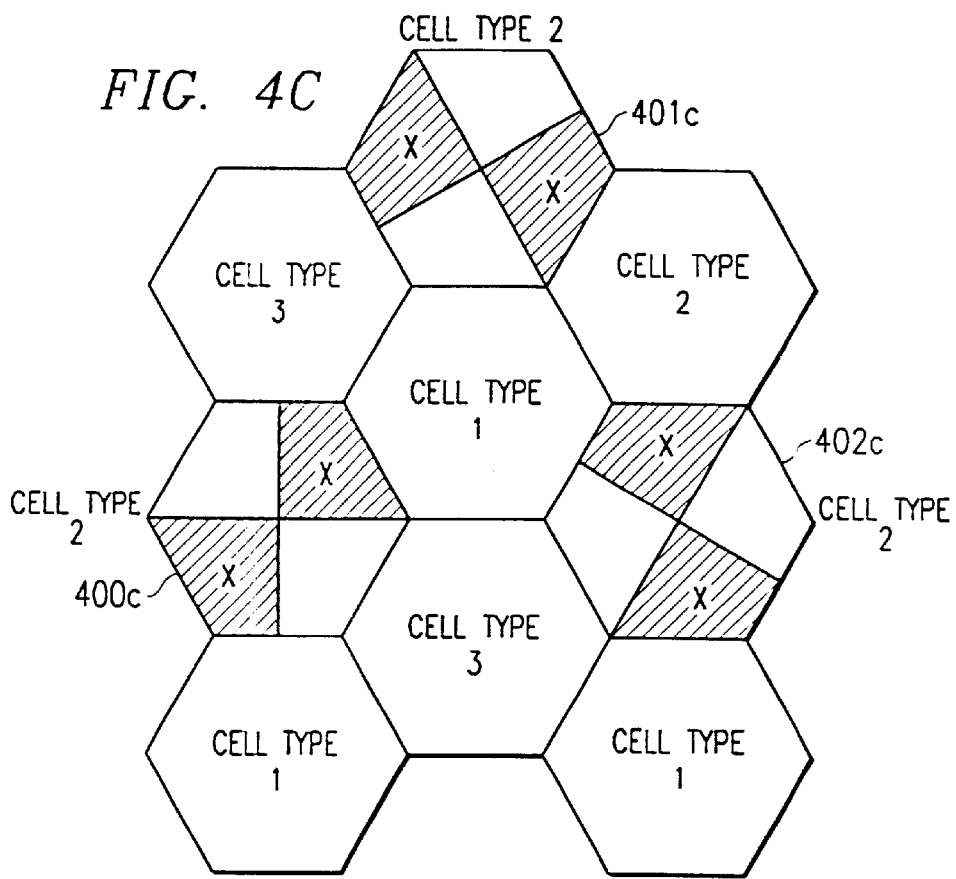
FIG. 4C depicts the inventive pattern of FIG. 3 populated with four sector cells of the three different cell types, wherein reuse of a cell type has sector rotation according to the present invention.

Alternative embodiments of cells deployed according to the present invention, utilizing various sector sizes, are shown in FIGS. 4B and 4C. Specifically, FIG. 4B illustrates use of 30 degree sectors, such as may utilize the full channel sets of FIG. 3B, including reuse of the channel sets at 180 degrees. In FIG. 4B, cell 400*b* has channel X at the 345 degree (−15 degree) position, while cell 401*b* has the X channel at the 45 degree position, and cell 402*b* has the X channel at the 105 degree position.

FIG. 4C illustrates use of 90 degree sectors, such as may be utilized in an initial deployment or in providing redundant links or protect sectors as described in more detail below. In FIG. 4C, cell 400*c* has channel X at the 45 degree position, while cell 401*c* has the X channel at the 105 degree position, and cell 402*c* has the X channel at the 165 degree position. It should be appreciated that, because of the beam width of the sectors of FIG. 4C, the illustrated rotation does not cause complete avoidance of adjacent cells (i.e., cells 400*c*, 401*c*, and 402*c*) transmitting/receiving in parallel directions. Accordingly, different ones of the available channels of that cell type may be used in these adjacent cells in such an embodiment, such as where the distance between these adjacent cells is insufficient to provide desired co-channel isolation of signals.

For example, assuming cells 400*c*, 401*c*, and 402*c* are of cell type 2, channel X of cell 400*c* may correspond to channel $B_V$ of cell type 2. However, the use of the 90 degree sectors, such as to provide for later build out of the cell as described in the above referenced patent application entitled "System and Method for Providing a Communication System Configurable for Increased Capacity," does not utilize all channels of the cell type of the preferred embodiment. Accordingly, channel X of cell 401*c* may correspond to channel $S_V$, which, according to the preferred embodiment assignment techniques, is available for assignment within the area associated with channel X. Similarly, channel X of cell 402*c* may correspond to channel $F_V$, which according to the preferred embodiment assignment techniques, is also available for assignment within the area associated with channel X. However, it should also be appreciated that even with the wide beamwidths of this embodiment there is no boresight alignment of sectors reusing a particular channel and the above described rotation of channels may not be advantageous or desirable in all situations.

Figure 6A:
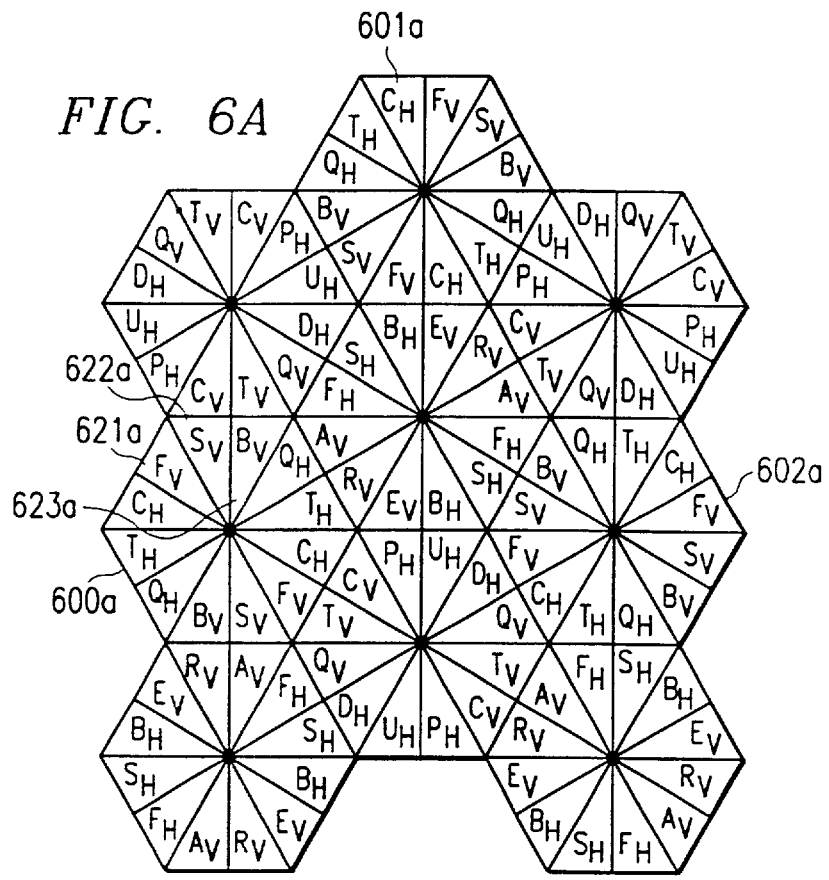
FIGS. 6A an 6B depict provision of redundant sectors according to the present invention.
Figure 6B:
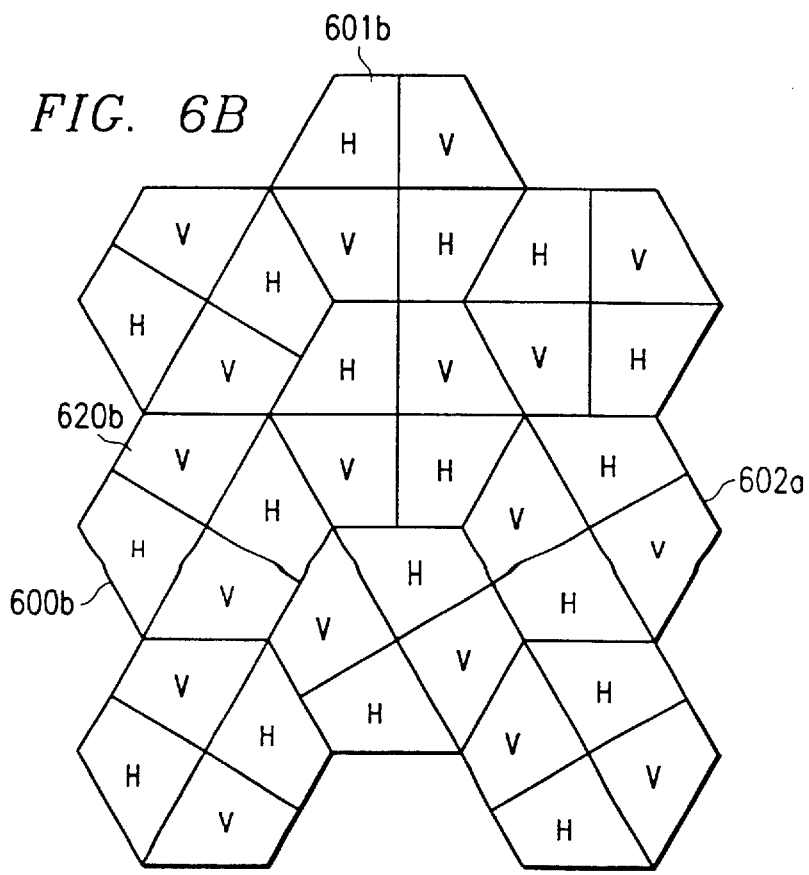

Directing attention to FIG. 6A, a preferred embodiment cell cluster deployment using the preferred embodiment channel assignments of FIG. 3B is shown. As discussed above with respect to FIGS. 4A through 4C, the channel assignments for each cell type are rotated when reused in the pattern. FIG. 6B shows a preferred embodiment redundancy sector assignment corresponding to the primary sector assignments of FIG. 6A (it being understood that the sector designations "V" and "H" in FIG. 6B represent a polarization assigned to that sector). Specifically, although shown separated, the sectors of FIGS. 6A and 6B are overlaid in the preferred embodiment such that cell 600*a* and 600*b* correspond to the same geographic region, cell 601*a* and 601*b* correspond to the same geographic region, cell 602*a* and 602*b* correspond to the same geographic region, etcetera. Accordingly, redundant sectors available to provide redundant links for a plurality of primary sectors are provided as described in detail in the above referenced patent application entitled "System and Method for Providing Redundancy in a Sectored Wireless Communication System." Of course, the present invention is not limited to the particular sector sizes illustrated, nor the use of the same sector sizes throughout the primary and/or redundant sectors.

It should be appreciated that the channel assignments of the primary sectors according to the present invention are adapted to accommodate such redundant sectors. Specifically, rather than alternating the use of polarization orthogonality between each of the adjoining or flanking sectors, as described in detail with respect to a preferred embodiment shown and described in the above referenced patent application entitled "Frequency Re-Use for TDD Applications," the preferred embodiment of the present invention utilizes blocks of commonly polarized sectors. Experimentation has revealed that separating adjoining channels in a cell configuration, as shown above with respect to the preferred embodiment cell types 1–4, sufficient isolation may be realized, such as when the preferred embodiment radio modules operating at millimeter wave frequencies using parabolic dish or horn type antennas, that the additional signal orthogonality associated with alternate polarization is not always desirable between adjoining sectors.

For example, testing has revealed that the preferred embodiment radio modules, such as shown and described in above referenced U.S. Pat. No. 6,016,313, may be relied upon to provide approximately 75 to 90 dB of signal isolation between adjoining sectors when carefully deployed at a hub of the present invention. Accordingly, ones of the adjacent or flanking sectors may be commonly polarized and yet still provide a desired level of signal isolation when properly deployed. According to the preferred embodiment, selection of channel allocation is such that particular channels having relatively little separation, such as the aforementioned 2 channels between them, are provided in the channel allocation scheme to also incorporate polarization orthogonality, such as channels $E_V$ and $B_H$ of cell type 1, whereas particular channels having relatively large separation, such as channels $A_V$, $R_V$, and $E_V$ of cell type 1, are permitted to be grouped in a block having common polarization.

According to a preferred embodiment of the present invention, blocks of adjoining sectors are commonly polarized to thereby adapt the channel reuse pattern for optimized use of redundant devices, such as the redundant radio units shown and described in the above referenced patent application entitled "System and Method for Providing Redundancy in a Sectored Wireless Communication System," having the same polarization as the block of sectors for which it is providing link redundancy. In such an embodiment, any need for remote or subscriber communication units to alter their operation in the event it becomes necessary to communicate via the redundant sector may be eliminated or minimized. For example, where the redundant radio module associated with the redundant sector is channel agile, upon failure of an underlying primary sector radio module, the redundant sector radio module may simply begin operating with the channel assignment originally associated with the now failed primary radio module. Specifically, redundant sector 620b of cell 600b, having vertical polarization and overlying sectors 621a, 622a, and 623a of cell 600a (each also having vertical polarization), may be assigned channel $F_V$ upon failure of the radio module associated with sector 621a, thereby requiring no alteration of operation at any remote or subscriber units operating in sector 621a. However, such a use of channel $F_V$ in the wide beam of sector 620b may introduce undesired interference in another sector and/or cell reusing channel $F_V$ according to the present invention.

Therefore, a preferred embodiment of the present invention utilizes unique channels, such as those available from cell type 4 which generally remain unused in the channel reuse pattern of the present invention. For example, upon failure of the radio module associated with sector 621a, remote or subscriber units within this sector may alter their operation to a particular different channel, such as one selected from the channels of cell type 4, to communicate with a radio unit of redundant sector 620b also operating upon this channel.

Although this preferred embodiment relies upon some alteration of the operation of the remote or subscriber units, it should be appreciated that selection of an alternate channel at a channel agile remote unit is typically a readily implementable task (techniques for selection of the channel and coordinating alteration to a selected channel are shown and described in the above reference patent application entitled "System and Method for Providing Redundancy in a Sectored Wireless Communication System"). In contrast, alteration to select a different polarization may necessitate physical manipulation of an antenna structure or deployment of multiple, differently polarized, antenna structures and selective switching between their signal streams. It is believed that the preferred embodiment of the present invention, providing a common polarization throughout the primary sectors of an area covered by a redundant sector, allows for simplified implementation.

It should be appreciated that use of a channel of the reserve cell type in providing redundancy according to the present invention does not require dedication of such a channel to any particular redundant sector. For example, where each, or a plurality, of the cells of the cluster are in communication, such as through a centralized controller, particular channels of the reserve channels (channels of cell type 4 in the preferred embodiment) may be assigned temporarily as needed. For example, upon a first primary sector in the cluster failing, a first reserve channel may be assigned. Thereafter, upon a second primary sector in the cluster failing while the first primary sector remains inoperable, a second reserve channel may be assigned. The particular channels assigned for use by the redundant sectors may be made based upon a predetermined hierarchy and availability, such as first assigning channel $D_V$ if it is available and, if not, assigning $U_V$, etcetera. Additionally or alternatively, the particular channels assigned for use by a particular redundant sector may be made based upon information such as a channel which is available and which if deployed in the particular geographic region and/or orientation will not result in undesired interference in other sectors of the system.

Hypothetically only one channel of the reserve spectrum may be required to provide redundancy for the entire communication system according to the present invention. For example, in a system where the reliability of the components is such that it is unlikely that there will be simultaneous failures at multiple portions of the network, and/or that any simultaneous failures will be disposed such that use of a same channel in providing redundant links, thereby allowing a single channel of the reserve spectrum to be used for this purpose. Such an embodiment provides a large portion of the reserve spectrum for other uses, such as the aforementioned providing unique channels for use in point interference situations.

A preferred embodiment of the present invention provides at least 2 channels of the reserve spectrum for use in providing redundant sectors. Specifically, this most preferred embodiment provides a channel of the reserve spectrum having a first polarization (e.g. one of channels $D_V$, $U_V$, or $P_V$) and a channel of the reserve spectrum having a second polarization (e.g. one of channels $E_H$, $A_H$, or $R_H$) so as to allow their assignment in a redundant sector of corresponding polarization. Such a technique avoids a problem with a particular channel of the reserve spectrum being deployed in a sector of orthogonal polarization and, thus, providing a redundant sector having a channel assignment identical to that of an existing primary sector.

It should be appreciated that the reserve spectrum of the present invention is not limited to use in providing redundant links. For example, channels of this spectrum may be utilized in providing additional bandwidth. A preferred embodiment of the present invention deploys one or more of the reserve spectrum channels for simultaneous use with channels of a primary sector in an area where additional communication capacity is desired. For example, one or more of the redundant sectors of FIG. 6B may be assigned a channel or channels of the reserve spectrum in order to provide additional bandwidth in particular areas. Of course, sector sizes other than those illustrated in FIG. 6B may be utilized, if desired. For example, redundant sectors utilized in providing added capacity may be provided in sectors larger or smaller than those of FIG. 6B in order to provide added capacity in a desired area.

It should be appreciated that according to a preferred embodiment that both deploying of reserve spectrum to provide links in the event of a primary link failure and to provide added capacity may be implemented simultaneously, such as where a portion of the reserve spectrum is reserved for deployment in each situation. Moreover, it should be appreciated that when such multiple uses are put to the reserve spectrum, various sector sizes, orientations, and/or polarizations may be utilized among the various situations.

It should be appreciated that the structure of the cell, e.g. hexagonal, is unlikely to be the actual radiation pattern for the transmission signals or representative of the useable area of the radiation pattern. The structure of the cell is used to aid a designer of the cluster in laying out the different frequencies to be used in the cluster. The structure of the cell is preferably selected based on the number of channels needed to satisfy users demand in a particular cell, and/or the antenna sector beam widths. For example, given a 360 degree circle, if 12 channels are required, then 30 degree sector beam antennas are used (360/12=30). The 12 channels, having a common denominator of 3, is preferably used with a hexagonal structure. Similarly if 45 sector beam antennas are to be used, then a total of 8 channels per cell would be available (360/45=8). Such a cell could be shown as an octagon or square. Thus, for a 60 degree antennas, a hexagon might be preferable, while for 90 degree antennas, a square might be preferable.

Similarly, the antenna sector beams shown in the FIGURES is not the actual radiation pattern of the antennas, but rather is an idealized version to aid a designer of the cluster.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A frequency re-use pattern for a communication frequency spectrum for a point to multipoint wireless communication system comprising plural cells each divided into plural primary sectors wherein each of the plural cells includes a base station located proximate to the geometric center of the cell and one or more remote stations distributed within the cell, said frequency re-use pattern comprising:

a plurality of polarized channels wherein each polarized channel is comprised of one of a plurality of non-overlapping channels within said frequency spectrum in either a first or a second polarization wherein said first and second polarizations are orthogonal;

a plurality of cell types wherein each of the plurality of cell types is assigned a number of polarized channels of the first of said orthogonal polarizations and an equal number of polarized channels of the second of said orthogonal polarizations such that each one of said plurality of polarized channels is assigned to only one cell type, whereby the polarized channels assigned to a one of the plurality of cell types provides communication links within each cell between the base station and the remote stations of said each cell of said one of the plurality of cell types;

a plurality of groups of cells wherein each one of the plurality of groups of cells contains cells of only one cell type; and a contiguous pattern of cells comprised of said plurality of groups of cells wherein said contiguous pattern of cells is arranged such that no adjoining cells are of the same cell type, thereby creating a frequency re-use pattern.

2. The frequency re-use pattern of claim 1 wherein for each cell type the polarized channels assigned to said each cell type are assigned to adjacent primary sectors in each cell of the cell type thereby forming a block of primary sectors in said each cell wherein the block of primary sectors is repeated an integral number of times to provide full communication coverage for the cell.

3. The frequency re-use pattern of claim 2 wherein the polarized channels assigned to adjacent primary sectors are non-adjacent channels on the frequency spectrum.

4. The frequency re-use pattern of claim 3 wherein polarized channels of like polarization are assigned to contiguous primary sectors within said block of primary sectors thereby forming two adjacent sub-blocks of primary sectors within the block of primary sectors wherein the polarization of the polarized channels within a one of said sub-blocks is the same.

5. The frequency re-use pattern of claim 4 wherein the primary sectors are congruent.

6. The frequency re-use pattern of claim 5 wherein the primary sectors are 30, 45, 60, or 90 degrees.

7. The frequency re-use pattern of claim 6 wherein the primary sectors are non-overlapping.

8. The frequency re-use pattern of claim 4 wherein the point to multipoint wireless communication system is an adaptive time division duplex system for the broadband short distance radio communication in the millimeter wave frequency spectrum of bursty data from one computer network to another computer network.

9. The frequency re-use pattern of claim 8 wherein the number of cell types is greater than the number of groups of cells.

10. The frequency re-use pattern of claim 9 wherein ones of the polarized channels of the cell types not assigned to one of the plural groups of cells are deployed in a redundant sector arrangement within each cell of said contiguous pattern of cells to thereby provide redundant communication links in each cell.

11. The frequency re-use pattern of claim 10 wherein the primary sectors are congruent.

12. The frequency re-use pattern of claim 11 wherein the redundant sectors are not congruent with the primary sectors.

13. The frequency re-use pattern of claim 12 wherein the primary sectors are 30 degrees and the redundant sectors are 90 degrees.

14. The frequency re-use pattern of claim 10 wherein each redundant sector is co-extensive with a sub-block of primary sectors.

15. The frequency re-use pattern of claim 14 wherein the polarization of each one of the redundant sectors is the same as the polarization of the associated co-extensive sub-block of primary sectors for said each one of the redundant sectors.

16. The frequency re-use pattern of claim 10 wherein the remaining ones of the polarized channels of the cell types not assigned to one of the plural group of cells are assigned to one or more primary sectors of one or more cells to thereby provide additional communication capacity for said one or more primary sectors.

17. The frequency re-use pattern of claim 10 wherein ones of the remaining ones of the polarized channels of the cell types not assigned to one of the plural group of cells are assigned to a microcell, wherein said microcell provides communication capacity over a select area of at least one of said cells.

18. The frequency spectrum re-use pattern of claim 17 wherein said select area of at least one of said primary cells is coextensive with the area of said one of said cells.

19. The frequency re-use pattern of claim 8 wherein the plurality of non-overlapping channels is twelve.

20. The frequency re-use pattern of claim 19 wherein the plurality of polarized channels is twenty-four.

21. The frequency re-use pattern of claim 20 wherein the plurality of cell types is four.

22. The frequency re-use pattern of claim 21 wherein the number of groups of cells is three.

23. A method of designing a frequency re-use pattern for a communication frequency spectrum for a point to multi-point wireless communication system comprising plural cells each divided into plural primary sectors wherein each of the plural cells includes a base station located proximate to the geometric center of the cell and one or more remote stations distributed within the cell, said method comprising the steps of:
  providing a plurality of polarized channels wherein each polarized channel is comprised of one of a plurality of non-overlapping channels within said frequency spectrum in either a first or a second polarization wherein said first and second polarizations are orthogonal;
  providing a plurality of cell types wherein each of the plurality of cell types is assigned a number of polarized channels of the first of said orthogonal polarizations and an equal number of polarized channels of the second of said orthogonal polarizations such that each one of said plurality of polarized channels is assigned to only one cell type, whereby the polarized channels assigned to a one of the plurality of cell types provides communication links within each cell between the base station and the remote stations of said each cell of said one of the plurality of cell types;
  providing a plurality of groups of cells wherein each one of the plurality of groups of cells contains cells of only one cell type; and
  arranging the cells in a contiguous pattern of cells comprised of said plurality of groups of cells wherein said contiguous pattern of cells is arranged such that no adjoining cells are of the same cell type, thereby creating a frequency re-use pattern.

24. The method of claim 23 including the step of assigning, for each cell type, the polarized channels assigned to said each cell type to adjacent primary sectors in each cell of the cell type thereby forming a block of primary sectors in said each cell wherein the block of primary sectors is repeated an integral number of times to provide full communication coverage for the cell.

25. The method of claim 24 wherein the polarized channels assigned to adjacent primary sectors are non-adjacent channels on the frequency spectrum.

26. The method of claim 25 wherein polarized channels of like polarization are assigned to contiguous primary sectors within said block of primary sectors thereby forming two adjacent sub-blocks of primary sectors within the block of primary sectors wherein the polarization of the polarized channels within a one of said sub-blocks is the same.

27. The method of claim 26 wherein the primary sectors are congruent.

28. The method of claim 27 wherein the primary sectors are 30, 45, 60, or 90 degrees.

29. The method of claim 28 wherein the primary sectors are non-overlapping.

30. The method of claim 26 wherein the point to multi-point wireless communication system is an adaptive time division duplex system for the broadband short distance radio communication in the millimeter wave frequency spectrum of bursty data from one computer network to another computer network.

31. The method of claim 30 wherein the number of cell types is greater than the number of groups of cells.

32. The method of claim 31 including the step of deploying in a redundant sector arrangement within each cell of said contiguous pattern of cells, ones of the polarized channels of the cell types not assigned to one of the plural groups of cells to thereby provide redundant communication links in each cell.

33. The method of claim 32 wherein the primary sectors are congruent.

34. The method of claim 33 wherein the redundant sectors are not congruent with the primary sectors.

35. The method of claim 34 wherein the primary sectors are 30 degrees and the redundant sectors are 90 degrees.

36. The method of claim 32 wherein each redundant sector is co-extensive with a sub-block of primary sectors.

37. The method of claim 36 wherein the polarization of each one of the redundant sectors is the same as the polarization of the associated co-extensive sub-block of primary sectors for said each one of the redundant sectors.

38. The method of claim 32 including the step of assigning to one or more primary sectors of one or more cells the remaining ones of the polarized channels of the cell types not assigned to one of the plural group of cells to thereby provide additional communication capacity for said one or more primary sectors.

39. The method of claim 32 including the step of assigning to a microcell ones of the remaining ones of the polarized channels of the cell types not assigned to one of the plural group of cells, wherein said microcell provides communication capacity over a select area of at least one of said cells.

40. The method of claim 39 wherein said select area of at least one of said primary cells is coextensive with the area of said one of said cells.

41. The method of claim 30 wherein the plurality of non-overlapping channels is twelve.

42. The method of claim 41 wherein the plurality of polarized channels is twenty-four.

43. The method of claim 42 wherein the plurality of cell types is four.

44. The method of claim 43 wherein the number of groups of cells is three.

45. A frequency re-use pattern for a communication frequency spectrum for a point to multipoint wireless communication system comprising plural cells each divided into plural primary sectors wherein each of the plural cells includes a base station located proximate to the geometric center of the cell and one or more remote stations distributed within the cell, said frequency re-use pattern comprising:

a plurality of polarized channels;

a plurality of cell types, wherein adjacent primary sectors have different polarizations;

a plurality of groups of cells wherein each one of the plurality of groups of cells contains cells of only one cell type; and a contiguous pattern of cells comprised of said plurality of groups of cells wherein said contiguous pattern of cells is arranged such that no adjoining cells are of the same cell type, thereby creating a frequency re-use pattern.

46. The frequency re-use pattern of claim 45 wherein said polarizations are orthogonal.

47. The frequency re-use pattern of claim 45 wherein each of said polarized channels is comprised of one of a plurality of non-overlapping channels within said frequency spectrum in either a first or a second polarization.

48. The frequency re-use pattern of claim 47 wherein said first and second polarizations are orthogonal.

49. The frequency re-use pattern of claim 48 wherein each of said plurality of cell types is assigned a number of polarized channels of said first polarization and an equal number of polarized channels of said second polarization.

50. The frequency re-use pattern of claim 49 wherein said plurality of polarized channels are assigned to only one cell type, whereby the polarized channels assigned to a one of the plurality of cell types provides communication links within each cell between the base station and the remote stations of said each cell of said one of the plurality of cell types.

51. A method of designing a frequency re-use pattern for a communication frequency spectrum for a point to multi-point wireless communication system comprising plural cells each divided into plural primary sectors wherein each of the plural cells includes a base station located proximate to the geometric center of the cell and one or more remote stations distributed within the cell, said method comprising the steps of:

providing a plurality of polarized channels;

providing a plurality of cell types wherein adjacent primary sectors have different polarizations;

providing a plurality of groups of cells wherein each one of the plurality of groups of cells contains cells of only one cell type; and arranging the cells in a contiguous pattern of cells comprised of said plurality of groups of cells wherein said contiguous pattern of cells is arranged such that no adjoining cells are of the same cell type, thereby creating a frequency re-use pattern.

52. The method of claim 51 wherein said polarizations are orthogonal.

53. The method of claim 51 wherein each polarized channel is comprised of one of a plurality of non-overlapping channels within said frequency spectrum in either a first or a second polarization.

54. The method of claim 53 wherein said first and second polarizations are orthogonal.

55. The method of claim 54 wherein said each of the plurality of cell types is assigned a number of polarized channels of said first polarization and an equal number of polarized channels of said second polarization.

56. The method of claim 55 wherein the step of providing a plurality of cell types further comprises the step of:

assigning said plurality of polarized channels to only one cell type, whereby the polarized channels assigned to a one of the plurality of cell types provides communication links within each cell between the base station and the remote stations of said each cell of said one of the plurality of cell types.

\* \* \* \* \*